United States Patent [19]

Ichikawa et al.

[11] Patent Number: 5,511,857
[45] Date of Patent: Apr. 30, 1996

[54] WHEEL CAP FOR AUTOMOBILE

[75] Inventors: Takashi Ichikawa; Noboru Ohtsuka, both of Aichi, Japan

[73] Assignee: Kabushiki Kaisha Tokai Rika Denki Seisakusho, Aichi, Japan

[21] Appl. No.: 418,384

[22] Filed: Apr. 7, 1995

[30] Foreign Application Priority Data

Apr. 7, 1994 [JP] Japan .................................. 6-069275

[51] Int. Cl.⁶ ...................................... B60B 7/01
[52] U.S. Cl. ...................................... 301/37.23; 301/37.1
[58] Field of Search ............................. 301/37.1, 37.22, 301/37.23, 37.24, 37.42

[56] References Cited

U.S. PATENT DOCUMENTS

| | | | |
|---|---|---|---|
| 2,964,357 | 12/1960 | Barnes | 301/37.23 |
| 3,048,444 | 8/1962 | Lyon | 301/37.23 |
| 5,372,406 | 12/1994 | Ohtsuka et al. | 301/37.23 |

FOREIGN PATENT DOCUMENTS

| | | | |
|---|---|---|---|
| 630116 | 10/1961 | Canada | 301/37.23 |
| 62-90201 | 6/1987 | Japan . | |
| 680120 | 10/1952 | United Kingdom | 301/37.23 |

*Primary Examiner*—Russell D. Stormer
*Attorney, Agent, or Firm*—Birch, Stewart, Kolasch & Birch

[57] ABSTRACT

A mechanism for connecting a flexible annular molding to a peripheral edge part of a wheel cap body which prevents an appearance of a wheel cap having the annular molding and the wheel cap body from being degraded when the annular molding is detached from the wheel cap body. The flexible annular molding is connected to the peripheral edge part of the wheel cap body by an annular clamping member. The annular molding has a radially inward peripheral edge part provided with a plurality of through-holes, whereas the annular clamping member has a plurality of engaging claws each of which has a stem part that extends through the corresponding through-hole, and a locking tip part which bends radially inwardly from a tip portion of the stem part. Both the peripheral edge part of the wheel cap body and a part of the radially inward peripheral edge part of the annular molding are sandwiched between an annular base part and the locking tip part of the clamping member with the stem part thereof penetrating through the through-hole. When the annular molding is detached from the wheel cap body, the appearance of the wheel cap body is not spoiled because the annular molding has no through-hole.

12 Claims, 4 Drawing Sheets

WHEEL CAP FOR AUTOMOBILE

BACKGROUND OF THE INVENTION

1. Field of the Invention

The present invention generally relates to a wheel cap for an Automobile, and particularly relates to the wheel cap provided with a flexible annular molding around a body of the wheel cap.

2. Description of the Related Arts

Conventionally, there has been provided a wheel cap for an automobile, which has a rigid wheel cap body whose size is so designed that the peripheral surface thereof does not contact the side surface of the tire in order to prevent the wheel cap from falling off the wheel of the tire when the tire rides over a curbstone and its outside face swells during driving, for example, and a flexible annular molding fitted around the periphery of the wheel cap body. This type of wheel cap is prevented from being disengaged from the wheel of the tire by absorbing the swelling of the outside surface of the tire by the elastic deformation of the annular molding.

With this type of the wheel cap, it is necessary to securely fix the annular molding to the wheel cap body in order to prevent their disengagement from each other. For example, a wheel cap with a construction to securely fix the flexible annular molding to the rigid wheel cap body is presented in Japanese Utility Model Publication No. 06-050901 (corresponding to U.S. Pat. No. 5,372,406): the wheel cap has a flexible annular molding which has an engaging projection, with a constricted part at its root, extending inside from its radially inward peripheral edge part, and a rigid wheel cap body with a through-hole into which the engaging projection of the flexible annular molding is inserted with a pressure so that the constricted part thereof is engaged with the through-hole of the rigid wheel cap body to fix the flexible annular molding to the rigid wheel cap body.

With this construction, however, the wheel cap body becomes unattractive when the flexible annular molding is detached therefrom, for example, if the flexible annular molding is damaged and replaced with a new one, because the through-hole made in the wheel cap body is exposed outside. Therefore, it is desirable that the appearance of the wheel cap body is not spoiled when the flexible annular molding is detached from the wheel cap body.

SUMMARY OF THE INVENTION

Accordingly, it is an object of the present invention to provide a wheel cap, having a wheel cap body with no hole and a flexible annular molding, which makes it possible to releasably engage the flexible annular molding with the wheel cap body, to prevent the appearance of the wheel cap body from being spoiled at the time of detachment of the flexible annular molding from the wheel cap body.

In accomplishing this and other objects of the present invention, there is provided a wheel cap for an automobile comprising: a wheel cap body being formed approximately in a disk shape; a flexible annular molding which is fitted around a periphery of the wheel cap body; and an elastic annular clamping member for securing the flexible annular molding to the wheel cap body. The flexible annular molding has a radially inward peripheral edge part which has a radially inward surface in engagement with a radially outward surface of the wheel cap body and which has at least one through-hole penetrating through in a direction of thickness of the flexible annular molding. The elastic annular clamping member has an annular base part which overlaps an outside surface of a radially outward peripheral edge part of the wheel cap body and an outside surface of the radially inward peripheral edge part of the flexible annular molding, and at least one engaging claw, corresponding to the through-hole of the flexible annular molding, which extends inside from a back of the annular base part. The engaging claw has a stem part which extends through the through-hole of the flexible annular molding, and a locking tip part which bends radially inwardly from a tip portion of the stem part to hold the radially inward peripheral edge part of the wheel cap body and the inner peripheral edge part of the flexible annular molding together between the locking tip part and the annular base part.

Alternatively, the flexible annular molding may have a radially inward peripheral edge part which overlaps a radially outward peripheral edge part of the wheel cap body, and at least one through-hole which extends through in a direction of thickness of the flexible annular molding and is formed along a radially outward surface of the wheel cap body. The elastic annular clamping member may have an annular base part which overlaps an outer surface of the radially inward peripheral edge part of the flexible annular molding, and at least one engaging claw, corresponding to the through-hole of the flexible annular molding, which extends inside from a back of the annular base part. The engaging claw may have a stem part which passes through the through-hole of the flexible annular molding, and a locking tip part which bends radially inwardly from a tip portion of the stem part to hold the radially outward peripheral edge part of the wheel cap body and the radially inward peripheral edge part of the flexible annular molding together between the locking tip part and the annular base part.

According to each of the above constructions, the wheel cap body, the annular clamping member and the flexible annular molding are put together to build the wheel Cap as follows:

First, the stem part of the engaging claw of the flexible annular molding is flexed radially outwardly with the stem part of the engaging claw extending through the through-hole of the flexible annular molding.

Subsequently, the annular base part of the elastic annular clamping member is overlapped onto the surface of the outer peripheral edge part of the wheel cap body, so that the locking tip part of the engaging claw is engaged with the inside of the outer peripheral edge part of the wheel cap body, so that both the outer peripheral edge part of the wheel cap body and the inner peripheral edge part of the flexible annular molding are sandwiched between the annular base part and the locking tip part of the elastic annular clamping member.

According to each of the above constructions, the appearance of the wheel cap body is not spoiled at all when the flexible annular molding is detached from the wheel cap body, because the wheel cap body has no through-hole made therein.

In each of the above construction, it is preferable that the elastic annular clamping member has a plurality of engaging claws whereas the flexible annular molding has a plurality of through-holes which correspond to the engaging claws of the elastic annular clamping member, respectively. With this construction, when the flexible annular molding is set to the wheel cap body by the elastic annular clamping member, they are securely connected to each other.

In each of the above construction, the annular base part of the clamping member can be provided with a first hook part which bends towards the locking tip part of the engaging claw, wherein the radially outward peripheral edge part of the wheel cap body has a first engaging expansion, on its outside, whose convex surface is engaged with an inner surface of the first hook part from a radially outward side thereof when the elastic annular clamping member is connected to the wheel cap body; and/or the locking tip part of the elastic clamping member can be provided with a second hook part which bends towards the annular base part of the elastic annular clamping member, wherein the radially outward peripheral edge part of the wheel cap body has a second engaging expansion, on its inside, whose convex surface is engaged with an inner surface of the second hook part from a radially outward side thereof when the elastic annular clamping member is connected to the wheel cap body.

With this construction, the flexible annular molding is securely prevented from falling off the wheel cap body once the former is connected to the latter, because the first hook part of the annular clamping member engages with the first engaging expansion of the wheel cap body, and/or the second hook part thereof engages with the second engages with the second engaging expansion thereof.

In each of the above constructions, it is preferable that the elastic annular clamping member is integrated with the annular flexible molding by an insert molding.

With this construction, there is no need to connect the elastic annular clamping member to the flexible annular molding at the time of building the wheel cap, thereby simplifying the wheel cap building process.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This and other objects and features of the present invention will become clear from the following description taken in conjunction with the preferred embodiments thereof with reference to the accompanying drawings, in which.

DETAILED DESCRIPTION OF THE INVENTION

Figure 1:
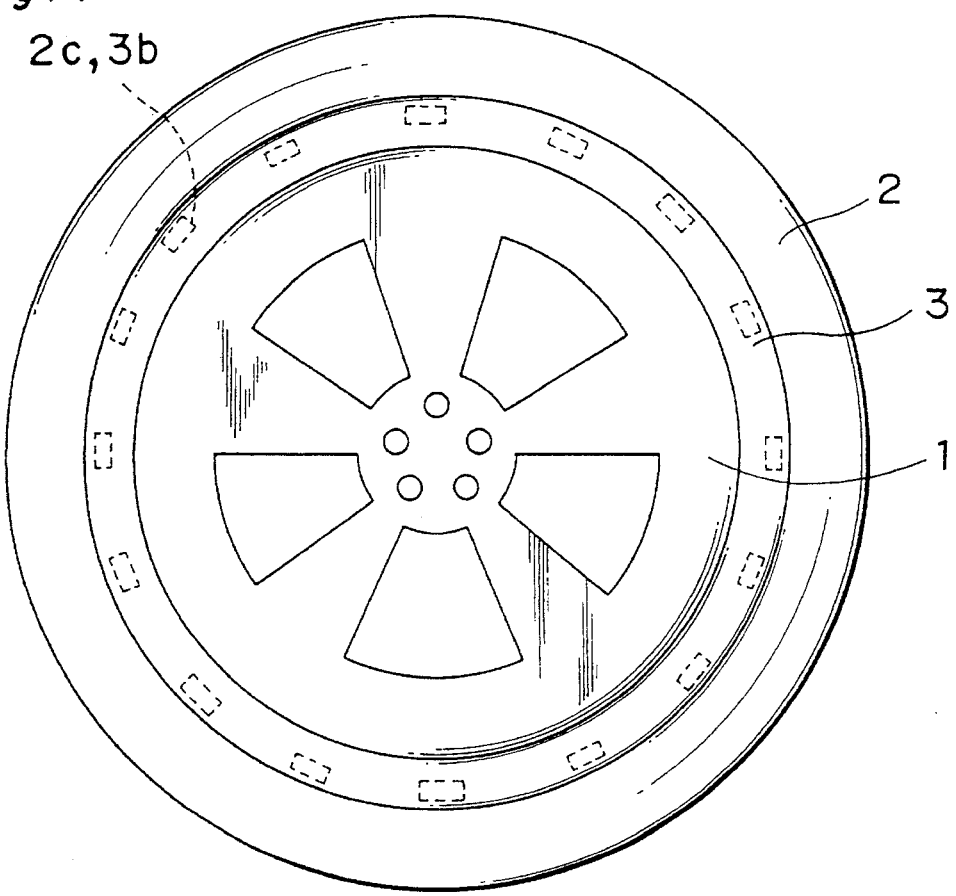
FIG. 1 is a front view of a wheel cap for an automobile, according to a first embodiment of the present invention.

Before the description of the present invention proceeds, it is to be noted that like or corresponding parts are designated by like reference numerals throughout the accompanying drawings.

First, referring to FIGS. 1 to 3, a detailed description is made below on a wheel cap for an automobile according to a first embodiment of the present invention.

FIG. 1 is a front elevation of the wheel cap for the automobile. The wheel cap has a round wheel cap body 1, a flexible annular molding 2 provided around the peripheral edge of the wheel cap body 1, and an annular clamping member 3 which connects the flexible annular molding 2 to the wheel cap body 1.

Figure 2:
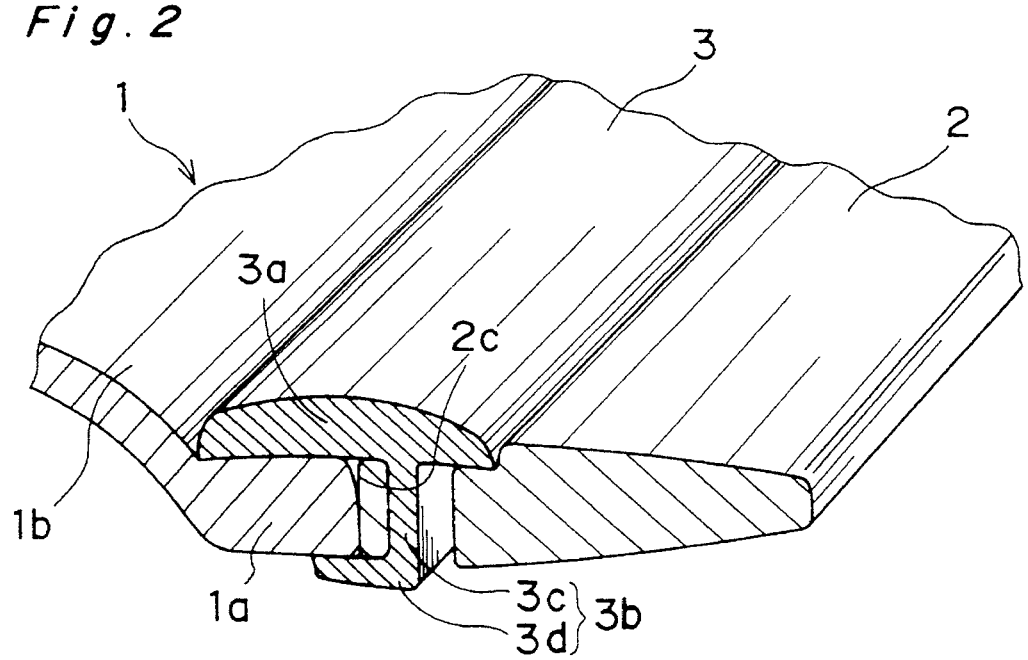
FIG. 2 is a perspective, cross-sectional broken view of FIG. 1, showing a mechanism for connecting a flexible annular molding to a wheel cap body.
Figure 3:
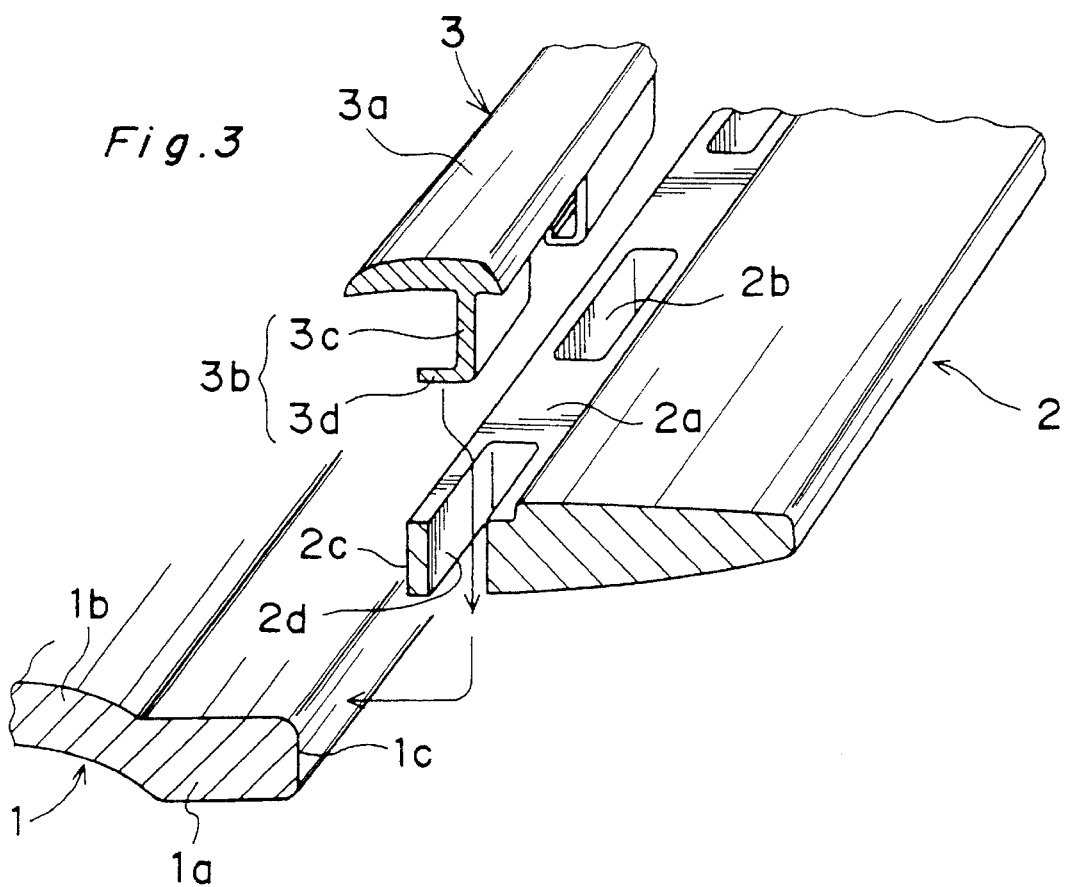
FIG. 3 is an exploded view of the wheel cap shown in FIG. 2.

FIG. 2 is a perspective, cross-sectional view which shows a mechanism for connecting the flexible annular molding 2 to the wheel cap body 1, and FIG. 3 is an exploded view of FIG. 2. The wheel cap body 1 is made of a rigid synthetic resin; and the wheel cap body 1 has a flat, peripheral edge part 1a, and a central part 1b, located inside and integrated with the peripheral edge part 1a, whose surface side (the upper surface side thereof in FIG. 2) is made convex.

The flexible annular molding 2 is made of a synthetic resin which has such a flexibility as enables the annular molding 2 to bend in accordance with a deformation of a corresponding tire. The flexible annular molding 2 has a radially inward surface 2c which engages with a radially outward surface 1c of the wheel cap body 1. The flexible annular molding 2 has a radially inward peripheral edge part 2a which has a plurality of through-holes 2b penetrated through in a thickness direction substantially perpendicular to the radius of the wheel cap. The through-holes 2b are made in the radially inward peripheral edge part 2a of the flexible annular molding 2 with a predetermined pitch between adjacent through-holes, as shown in FIG. 1, and the pitch therebetween and the configuration of the through-holes can be designed as desired.

The clamping member 3 has an annular base part 3a which overlaps both an outside surface of the peripheral edge part 1a of the wheel cap body 1 and an outside surface of the radially inward peripheral edge part 2a of the flexible annular molding 2. The clamping member 3 further has a plurality of engaging claws 3b which extend inside through the corresponding through-holes 2b. Each engaging claw 3b has a stem part 3c which passes through the through-hole 2b of the flexible annular molding 2; and a locking tip part 3d which bends radially inwardly from a tip part of the stem part 3c. The stem part 3c of the clamping member 3 is so constructed that it contacts a radially inward side surface 2d of the through-hole 2b, and the locking tip part 3d is so designed that both the peripheral edge part 1a of the wheel cap body 1 and the radially inward peripheral edge part 2a of the annular molding are sandwiched in between the locking tip part 3d and the annular base part 3a of the clamping member 3. The outside surface of the peripheral edge part 1a and the inside surface thereof are sandwiched with an inner surface of the annular base part 3a and an inner surface of the locking tip part 3d. The engaging claw 3b of the clamping member 3 is made of a synthetic resin with such a predetermined flexibility as prevents the easy disengagement of the engaging claw 3b from the peripheral edge part 1a of the wheel cap body 1.

In this embodiment, the flexible annular molding 2 is connected to the wheel cap body 1 as follows; that is, the flexible annular molding 2 is connected to the clamping member 3 either by inserting the engaging claws 3b of the clamping member 3 into the through-holes 2b of the flexible annular molding 2 while the engaging claw 3b is forced to bend radially outwardly, or by inserting the engaging claws 3b into the through-holes 2b with the flexible annular molding 2 or the clamping member 3 being totally deformed in an oval shape.

Next, the engaging claw 3b of the clamping member 3 is pushed, from the side of the radially outward surface 1c of the wheel cap 1, to make the locking tip part 3d of the engaging claw 3b engage with the peripheral edge part 1a of the wheel cap body 1 after the annular base part 3a is overlapped onto the outside surface of the peripheral edge part 1a of the wheel cap 1 with the engaging claw 3b elastically bending radially outwardly. With this state, the flexible annular molding 2 is secured to the wheel cap body 1 with both the peripheral edge part 1a of the wheel cap 1 and a part of the radially inward peripheral edge part 2a of the annular molding 2 being embraced with the engaging claws 3b and the annular base part 3a of the clamping member 3.

According to this embodiment, the flexible annular molding 2 is securely connected to the wheel cap 1, because the clamping member 3 has the plural engaging claws 3b around in the position corresponding to the plural through-holes 2b of the flexible annular molding 2. Furthermore, the appearance of the wheel cap body is not spoiled when the flexible annular molding 2 is detached from the wheel cap body 1 for replacement, because the wheel cap body 1 has no through-hole made therein.

Figure 4:
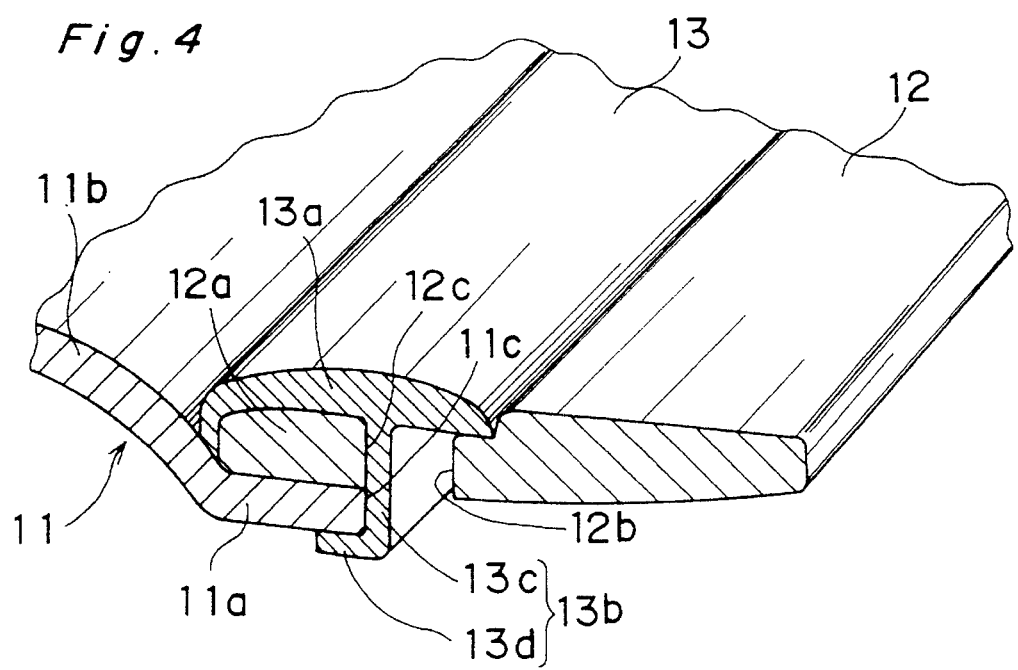
FIG. 4 is a perspective view similar to FIG. 2, showing a wheel cap for an automobile, according to a second embodiment of the present invention.

Second, referring to FIG. 4, a detailed description is made below on a wheel cap for an automobile according to a second embodiment of the present invention.

A wheel cap body 11 has a construction similar to that of the wheel cap body 1 of the above first embodiment: the wheel cap body 11 has a peripheral edge part 11a and a central part 11b. The wheel cap of this embodiment, however, has such a different construction that a flexible annular molding 12 has a radially inward peripheral edge part 12a which overlaps a peripheral edge part 11a of the wheel cap body 11. Also, the flexible annular molding 12 has a plurality of through-holes 12b, similar to the through-holes 2b shown in the first embodiment, whose radially inward side surface 12c, located radially inwardly relative to the through-hole, is made so as to correspond to a radially outward surface 11c of the wheel cap body 11.

A clamping member 13 has an annular base part 13a which overlaps the radially inward peripheral edge part 12a of the flexible annular molding 12, and a plurality of engaging claws 13b each of which projects inside from the annular base part 13a. The engaging claw 13b has a stem part 13c which contacts both the radially inward side surface 12c of the flexible annular molding 12 and the radially outward surface 1c of the wheel cap body 11; and a locking tip part 13d which bends radially inwardly so that the peripheral edge part 11a of the wheel cap body 11 and the radially inward peripheral edge part 12a of the flexible annular molding 12 are held together between the annular base part 13a and the locking tip part 13d.

Similar to the above first embodiment, the flexible annular molding 12 of the second embodiment is securely connected to the wheel cap body 11. In addition, the appearance of the wheel cap body 11 is not spoiled when the flexible annular molding 12 is detached from the wheel cap body 11, because the wheel cap body 11 has no through-hole.

Figure 5:
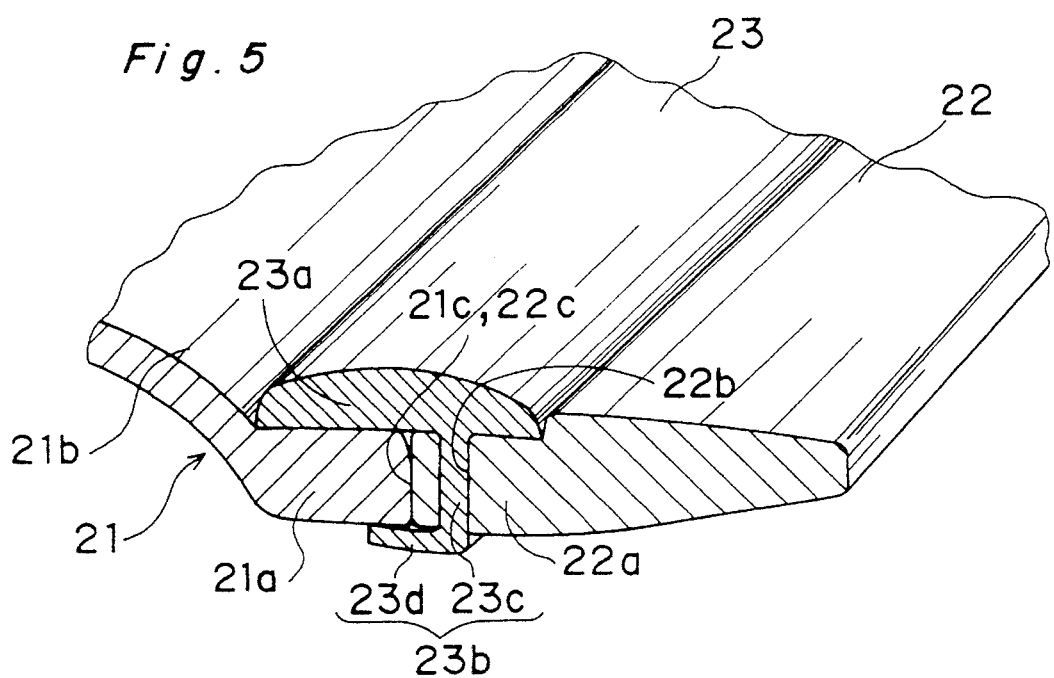
FIG. 5 is a perspective view similar to FIG. 2, showing a wheel cap for an automobile, according to a third embodiment of the present invention.

Third, referring to FIG. 5, a detailed description is made below on a wheel cap for an automobile according to a third embodiment of the present invention.

A wheel cap for an automobile according to the third embodiment is of a type in which a flexible annular molding 22 is integrated with an annular clamping member 23. Similar to the wheel cap of the first embodiment, the clamping member 23 has an annular base part 23a, and an engaging claw 23b which has a stem part 23c and a locking tip part 23d. The clamping member 23 is fixed to a radially inward peripheral edge part 22a of the flexible annular molding 22. The clamping member 23 is made of a synthetic resin with such a rigidity as makes it possible to sandwich a peripheral edge part 21a between the annular base part 23a and the locking tip part 23d with a predetermined pressure. The flexible annular molding 22 can be integrated with the clamping member 23, with the stem part 23c thereof being inserted through a through-hole 22b made in the flexible annular molding 22, in such a way that a synthetic resin with a greater flexibility than the synthetic resin from which the clamping member 23 is made, is injected with the clamping member 23 being disposed therein as an insert.

With this construction, it can be made easier or simplified to connect the flexible annular molding 22 to the wheel cap body 21, because there is no need to connect the clamping member 23 to the flexible annular molding 22. The flexible annular molding 22 is connected to the wheel cap body 21 as follows:

First, the flexible annular molding 22 is deformed so as to bend the engaging claw 23b of the clamping member 23 radially outwardly to some extent.

Next, the flexible annular molding 22 is positioned with respect to the wheel cap body 21 so that a radially outward surface 21c of the wheel cap body 21 contacts a radially inward surface 22c of the flexible annular molding 22.

Next, the locking tip portion 23d of the engaging claw 23b is so engaged with the peripheral edge part 21a of the wheel cap body 21 that the peripheral edge part 21a thereof is sandwiched between the annular base part 23a and the locking tip part 23d of the clamping member 23.

Fourth, referring to FIGS. 6 to 8, a detailed description is made below on a wheel cap for an automobile according to a forth embodiment of the present invention.

A wheel cap body 31 has a peripheral edge part 31a; a central part 31b whose thickness is smaller than that of the peripheral edge part 31a; a first engaging expansion 31f which swells or expands outside; a continuous, annular outside groove 31d formed on the outside of the wheel cap body 31 between the central part 31b and the first engaging expansion 31f; and a continuous, annular inside groove 31e formed on the inside or backside of the wheel cap body 31 near a radially outward surface 31c thereof. The inside groove 31e of the peripheral edge part 31a of the wheel cap body 31 is formed along the circumference of a substantial circle whose radius is greater than the radius of a circle the circumference of which substantially corresponds to the outside groove 31d. An inside or backside portion outside the inside groove 31e of the peripheral edge part 31a of the wheel cap 31 is formed as a second engaging expansion 31g.

Similar to the wheel cap according to the first embodiment, a flexible annular molding 32 is made of a synthetic resin with a predetermined flexibility enabling the annular molding 32 to be bent in accordance with a deformation of a tire. A radially inward surface 32c of the flexible annular molding 32 is formed so as to contact a radially outward surface 31c of the wheel cap body 31. A radially inward peripheral edge part 32a of the flexible annular molding 32 has a plurality of openings 32b.

The clamping member 33 has an annular base part 33a which overlaps both an outer surface of the peripheral edge part 31a of the wheel cap body 31 and an outer surface of the radially inward peripheral edge part 32a. The clamping member 33 has an engaging claw 33b which has a stem part 33c projecting inside relative to the annular base part 33a and a locking tip part 33d, integrated with the stem part 33c, which bends radially inwardly. The annular base part 33a has a first hook part 33e, at its radially inward side, which engages the outside groove 31d of the wheel cap body 31. Meanwhile, the locking tip part 33d of the engaging claw 33b has a second hook part 33f, at its radially inward side, which engages the inside groove 31e of the peripheral edge part 31a.

With this construction, the clamping member 33 is securely connected to the wheel cap body 31 because the first engaging expansion 31f engages with the annular base part 33a and the first hook part 33e, and the second engaging expansion 31g engages with the locking tip part 33d and the second hook part 33f, with the first hook part 33e engaging with the outside groove 31d and the second hook part 33f engaging with the inside groove 31e, thus the flexible annular molding 32 and the wheel cap body 31 are securely connected to each other.

Incidentally, the wheel cap body 31 is so constructed that a user's aesthetic sense is appealed to by the outside groove 31d thereof, when the flexible annular molding 32 is detached from the wheel cap body 31.

Alternatively, the peripheral edge part 31a of the wheel cap body 31 may have the inside groove 31e partially formed, instead of being formed as a complete circle as explained in the above fourth embodiment.

Figure 8:
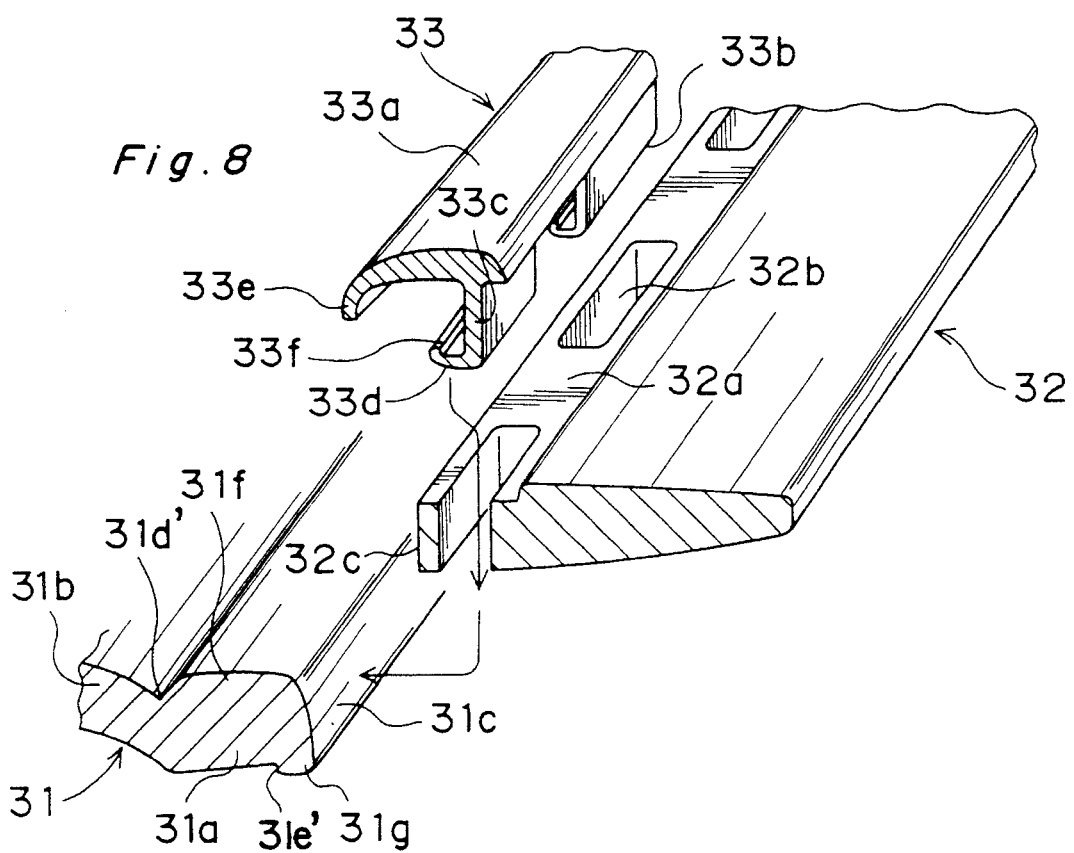
FIG. 8 is an exploded, perspective view according to a modification of the wheel cap shown in FIG. 6.

Alternatively, the wheel cap body 31 according to the fourth embodiment may be formed as shown in FIG. 8. That is, the wheel cap body 31 may be provided with a outside step part 31d' and a inside step part 31e' instead of the outside groove 31d and the inside groove 31e. In other words, the first engaging expansion 31f may be defined by the outside step part 31d' while the second engaging expansion 31g may be defined by the inside step part 31e'. With this construction, the first engaging expansion 31f of the wheel cap body 31 engages with the first hook part 33e, and the second engaging expansion 31g thereof engages with the second hook part 33f. In this way, the flexible annular molding 32 is securely connected to the wheel cap body 31.

Alternatively, in this modification of the fourth embodiment, the peripheral edge part 31a of the wheel cap body 31 may have the second engaging expansion 31g partially formed, instead of being formed as a complete circle.

Figure 6:
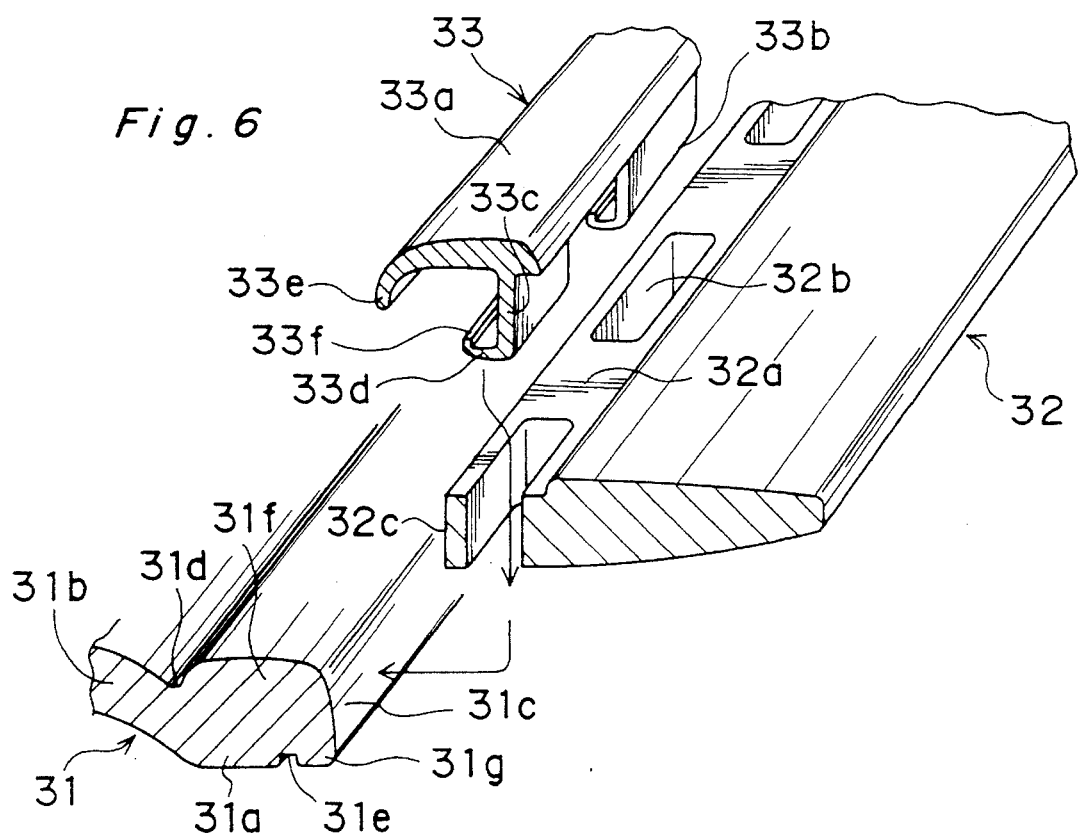
FIG. 6 is an exploded view of a wheel cap for an automobile, according to a fourth embodiment of the present invention.
Figure 7:
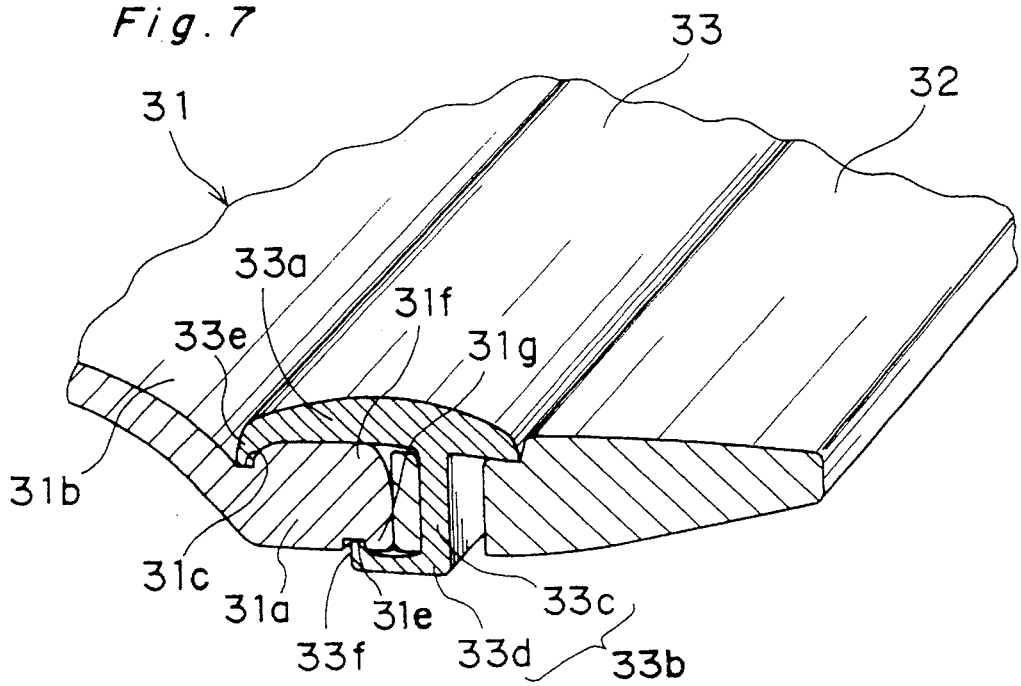
FIG. 7 is a perspective view similar to FIG. 2, showing the wheel cap for the automobile of FIG. 6.

Although the wheel caps, of the forth embodiment and its modified embodiment, shown in FIGS. 6–8, are constructed so that each side of the wheel cap body 31 has an engaging expansion 31f and 31g while the clamping member 33 has a pair of hook parts 33e and 33f corresponding to the engaging expansions 31f and 31g, the wheel caps may be constructed so that only one side of the wheel cap body has an engaging expansion while the clamping member has only one hook part corresponding to the engaging expansion.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A wheel cap for an automobile comprising:

a wheel cap body being formed approximately in a disk shape, a flexible annular molding which is fitted around a periphery of the wheel cap body, and an elastic annular clamping member for securing the flexible annular molding to the wheel cap body, the flexible annular molding having a radially inward peripheral edge part which has a radially inward surface in engagement with a radially outward surface of the wheel cap body and which has at least one through-hole penetrating through in a direction of thickness of the flexible annular molding, the elastic annular clamping member-having an annular base part which overlaps an outside surface of a radially outward peripheral edge part of the wheel cap body and an outside surface of the radially inward peripheral edge part of the flexible annular molding, and at least one engaging claw, corresponding to the through-hole of the flexible annular molding, which extends inside from a back of the annular base part, the engaging claw having a stem part which extends through the through-hole of the flexible annular molding, and a locking tip part which bends radially inwardly from a tip portion of the stem part to hold the radially outward peripheral edge part of the wheel cap body and the radially inward peripheral edge part of the flexible annular molding together between the locking tip part and the annular base part.

2. The wheel cap for an automobile as claimed in claim 1, wherein the annular base part of the annular clamping member is provided with a first hook part which bends towards the locking tip part of the engaging claw, wherein the radially outward peripheral edge part of the wheel cap body has a first engaging expansion, on its outside, whose convex surface is engaged with an inner surface of the first hook part from a radially outward side thereof when the elastic clamping member is connected to the wheel cap body.

3. The wheel cap for an automobile as claimed in claim 1, wherein the locking tip part of the elastic annular clamping member is provided with a second hook part which bends towards the annular base part of the elastic clamping member, wherein the radially outward peripheral edge part of the wheel cap body has a second engaging expansion, on its inside, whose convex surface is engaged with an inner surface of the second hook part from a radially outward side thereof when the elastic annular clamping member is connected to the wheel cap body.

4. The wheel cap for an automobile as claimed in claim 1, wherein the elastic annular clamping member is integrated with the annular flexible molding by an insert molding.

5. The wheel cap for an automobile as claimed in claim 2, wherein the elastic annular clamping member is integrated with the annular flexible molding by an insert molding.

6. The wheel cap for an automobile as claimed in claim 3, wherein the elastic annular clamping member is integrated with the annular flexible molding by an insert molding.

7. A wheel cap for an automobile comprising:

a wheel cap body being formed approximately in a disk shape;

a flexible annular molding which is fitted around a periphery of the wheel cap body; and an elastic annular clamping member for securing the flexible annular molding to the wheel cap body, the flexible annular molding having a radially inward peripheral edge part which overlaps a radially outward peripheral edge part of the wheel cap body, and at least one through-hole which extends through in a direction of thickness of the flexible annular molding and is formed along a radially outward surface of the wheel cap body, the elastic annular clamping member having an annular base part which overlaps an outer surface of the radially inward peripheral edge part of the flexible annular molding, and at least one engaging claw, corresponding to the through-hole of the flexible annular molding, which extends inside from a back of the annular base part, the engaging claw having a stem part which extends through the through-hole of the flexible annular molding, and a locking tip part which bends radially inwardly from a tip portion of the stem part to hold the radially outward peripheral edge part of the wheel cap body and the radially inward peripheral edge part of the flexible annular molding together between the locking tip part and the annular base part.

8. The wheel cap for an automobile as claimed in claim 7, wherein the annular base part of the annular clamping member is provided with a first hook part which bends towards the locking tip part of the engaging claw, wherein the radially outward peripheral edge part of the wheel cap body has a first engaging expansion, on its outside, whose convex surface is engaged with an inner surface of the first hook part from a radially outward side thereof when the elastic annular clamping member is connected to the wheel cap body.

9. The wheel cap for an automobile as claimed in claim 7, wherein the locking tip part of the elastic annular clamping member is provided with a second hook part which bends towards the annular base part of the elastic annular clamping member, wherein the radially outward peripheral edge part of the wheel cap body has a second engaging expansion, on its inside, whose convex surface is engaged with an inner surface of the second hook part from a radially outward side thereof when the elastic annular clamping member is connected to the wheel cap body.

10. The wheel cap for an automobile as claimed in claim 7, wherein the elastic annular clamping member is integrated with the annular flexible molding by an insert molding.

11. The wheel cap for an automobile as claimed in claim 8, wherein the elastic annular clamping member is integrated with the annular flexible molding by an insert molding.

12. The wheel cap for an automobile as claimed in claim 9, wherein the elastic annular clamping member is integrated with the annular flexible molding by an insert molding.

* * * * *